US010138591B2

(12) United States Patent
Bringewatt et al.

(10) Patent No.: US 10,138,591 B2
(45) Date of Patent: Nov. 27, 2018

(54) APPARATUS FOR FEEDING LAUNDRY ITEMS TO A MANGLE

(71) Applicant: Herbert Kannegiesser GmbH, Vlotho (DE)

(72) Inventors: Wilhelm Bringewatt, Porta Westfalica (DE); Engelbert Heinz, Vlotho (DE)

(73) Assignee: Herbert Kannegiesser GmbH, Vlotho (DE)

( * ) Notice: Subject to any disclaimer, the term of this patent is extended or adjusted under 35 U.S.C. 154(b) by 100 days.

(21) Appl. No.: 15/295,074

(22) Filed: Oct. 17, 2016

(65) Prior Publication Data

US 2017/0175322 A1 Jun. 22, 2017

(30) Foreign Application Priority Data

Dec. 16, 2015 (DE) .......................... 10 2015 016 230

(51) Int. Cl.
*D06F 67/04* (2006.01)
*H02K 41/00* (2006.01)
*B65G 54/02* (2006.01)

(52) U.S. Cl.
CPC ............. *D06F 67/04* (2013.01); *B65G 54/02* (2013.01); *H02K 41/00* (2013.01)

(58) Field of Classification Search
CPC ...... D06F 67/04; H02K 41/00; H02K 41/031; H02K 41/035–41/0358; B65G 54/02
See application file for complete search history.

(56) References Cited

U.S. PATENT DOCUMENTS

| 4,501,529 A * | 2/1985 | Wiebesiek | ............. D06F 67/04 294/104 |
| 5,333,402 A * | 8/1994 | Weir | ....................... D06F 67/04 271/268 |

(Continued)

FOREIGN PATENT DOCUMENTS

| CH | 699636 B1 | 4/2010 |
| DE | 2319654 A1 | 10/1974 |

(Continued)

OTHER PUBLICATIONS

European Patent Office, Europaischer Recherchenbericht (searchin related application), Feb. 23, 2017.

*Primary Examiner* — Ismael Izaguirre
(74) *Attorney, Agent, or Firm* — Laurence P. Colton; Smith Tempel Blaha LLC

(57) ABSTRACT

An apparatus whereby laundry items are fed automatically to a mangle. This is achieved in that splaying clamps are movable by a linear motor, wherein slides are assigned to a primary part of the linear motor or form the primary parts of the linear motor and a rail is assigned to a secondary part of the linear motor or forms the secondary part. Laundry items are fed in industrial laundry facilities to a mangle in an outspread state. This is performed by machine using apparatuses for feeding laundry items. Each laundry item attached to splaying clamps is deposited with an outspread front edge arranged to the front onto a feeding conveyor, which feeds the laundry item in the outspread state to the mangle. Here, the splaying can mean that the laundry item either is not completely outspread or that the laundry item is tensioned such that it is damaged irreversibly.

12 Claims, 3 Drawing Sheets

(56) References Cited

U.S. PATENT DOCUMENTS

| | | | | | |
|---|---|---|---|---|---|
| 5,440,810 | A | * | 8/1995 | Borucki | D06F 67/04 38/143 |
| 5,815,963 | A | * | 10/1998 | Rauch | D06F 67/04 38/143 |
| 7,380,356 | B2 | * | 6/2008 | Baboz | D06F 67/04 38/143 |
| 9,222,213 | B2 | * | 12/2015 | Garrone | D06F 67/04 |
| 2013/0249157 | A1 | * | 9/2013 | Endo | D06F 67/04 269/56 |
| 2016/0145055 | A1 | * | 5/2016 | Sielermann | B65G 47/90 414/751.1 |

FOREIGN PATENT DOCUMENTS

| | | |
|---|---|---|
| DE | 284381 A7 | 11/1990 |
| DE | 4244827 C2 | 11/2000 |
| DE | 102006038416 A1 | 2/2008 |
| DE | 102014214107 A1 | 2/2015 |
| EP | 2647757 A1 | 10/2013 |
| GB | 2247787 A | 3/1992 |
| SU | 1687686 A1 | 10/1991 |
| WO | 2005078909 A1 | 8/2005 |

\* cited by examiner

APPARATUS FOR FEEDING LAUNDRY ITEMS TO A MANGLE

STATEMENT OF RELATED APPLICATIONS

This application claims the benefit of and priority on German Patent Application No. 10 2015 016 230.6 having a filing date of 16 Dec. 2015.

BACKGROUND OF THE INVENTION

Technical Field

The invention relates to an apparatus for feeding laundry items to a mangle or the like comprising a feeding conveyor, a splaying device, which is arranged in front of the feeding conveyor in the feed direction of the laundry item and which has at least two clamps movable transversely to the feed direction along a rail and each assigned a slide for holding opposite corners of the laundry item, wherein the slides are movable with the clamps by at least one linear drive along the rail in order to stretch out the laundry item attached at the clamps.

Prior Art

Laundry items are passed as what is known as 'dry laundry' through a mangle in industrial laundry facilities after the washing and drying, and, during this process, the residual moisture in said items is removed, or said items are immediately folded in a folding device. The laundry items must be fed in an outspread state to the mangle, folding device, or another laundry treatment device. This is performed by machine by means of apparatuses for feeding laundry items.

Apparatuses of the type discussed here are used to feed laundry items by machine to a mangle or another laundry treatment device. The laundry items are fed by hand via opposite corners of an edge into loading clamps, which transfer the laundry items to splaying clamps in order to spread out the laundry items. Each outspread laundry item attached at the splaying clamps is then deposited with the outspread front edge arranged to the front on a feeding conveyor, which may optionally have a depositing strip. The feeding conveyor guides the laundry item in the outspread state to the mangle or another laundry treatment device.

A disadvantage of the known feeding of laundry items to a laundry treatment device, in particular a mangle, is the spreading of the laundry items by means of the splaying device. The adjacent corners of the front edge of the laundry item are usually taken over by or transferred, in a state close to one another, to the splaying clamps, which have been brought close together. As soon as the corners of the front edges of the laundry item are transferred to the splaying clamps, the clamps are moved away from one another along a rail transversely to the feed direction of the laundry item. So that the splaying clamps are driven away from one another to precisely such an extent that the laundry item is completely outspread, the width of the laundry item must firstly be determined, for example by a slack sensor. Previously, the splaying clamps were secured to slides which were in turn moved along the rail by means of belts. As a result of this belt drive the distance between the splaying clamps could be provided only very imprecisely and unreliably. As a result, the laundry item either is transferred to the feeding conveyor in a manner not fully outspread, or the laundry item is tensioned such that it is irreversibly damaged.

BRIEF SUMMARY OF THE INVENTION

The object of the invention is therefore to create an apparatus whereby laundry items can be fed to a mangle or the like in a simple and reliable manner, and whereby a high feeding rate can be ensured at the same time.

An apparatus for solving this problem is an apparatus for feeding laundry items to a mangle or the like, comprising a feeding conveyor, a splaying device, which is arranged in front of the feeding conveyor in the feed direction of the laundry item and which has at least two clamps movable transversely to the feed direction along a rail and each assigned a slide for holding opposite corners of the laundry item, wherein the slides are movable with the clamps by at least one linear drive along the rail in order to stretch out the laundry item attached at the clamps, characterized in that the clamps are movable by at least one linear motor, wherein the slides are each assigned to a primary part of the linear motor or the slides form the primary parts of the linear motor and the rail is assigned to the secondary part of the linear motor or the rail forms the secondary part. Accordingly, provision is made so that the splaying clamps can be moved by at least one linear motor, wherein the slides are each assigned to a primary part of the linear motor or the slides form the primary parts of the linear motor and the rail is assigned to the secondary part of the linear motor or the rail forms the secondary part. By moving the slide on the rail by means of a linear motor, any position of the rail can be reached by the slide quickly and reliably and very precisely. In contrast to conventional belt drives, the frictional resistance between the slide and the rail is extremely low, whereby the positioning accuracy is very accurate and reliable.

The present invention can preferably make provision so that the rail has a guide system for guiding the slides. A guide element of this guide system extends over the entire length of the rail and is fixedly installed thereon. The length of the guide system corresponds exactly to the maximum path of travel of the slides on the rail and is thus determined by the dimensioning of the apparatus. However, provision can also be made so that an apparatus has two separate guide systems for accommodating different types of laundry items.

In particular, provision can be made so that the guide system is assigned in addition a multiplicity of permanent magnets, of which the magnetic poles are arranged in an alternating sequence. The permanent magnets of the guide system together with the rail thus form the secondary part of the linear motor. Depending on the requirements of the apparatus for feeding laundry items, the permanent magnets can have different magnetic field strengths. The positioning accuracy of the slides relative to the rail can be defined by the distance between the individual permanent magnets.

Provision can also be made so that the slides each have at least one electromagnet, preferably at least one rotor winding, which is/are arranged directly opposite the permanent magnets. Each slide is generally assigned a pair of rotor windings. The slides are moved over the rail due to a phase-shifted change of the magnetic field polarity of the two rotor windings or the electromagnets. The speed of the slides on the rail can be controlled by the frequency of the polarity change of the rotor winding. By way of example, in order to move the slides into a holding position, provision can be made so that the positioning speed is low, wherein by contrast the running speed of the slides during the spreading is high.

In accordance with a further advantageous embodiment of the present invention provision can be made so that the clamps, in particular splaying clamps, are secured to the slides via a connection. This connection can be, for example, a plate made of metal or plastic. The splaying clamps can comprise a clamp jaw consisting of two elements, said jaw automatically opening and closing.

The present invention can also preferably make provision so that the at least one electromagnet is integrated in the connection, and the at least one electromagnet is preferably secured to the slide on a side of the rail opposite the connection. Here, provision can be made so that the slide annularly surrounds the rail completely. A narrow air gap is always provided between the electromagnet and the permanent magnets in order to keep the sliding resistance or the friction between the primary part and the secondary part as low as possible. As a result of this minimization of the mechanical resistance, the primary part can be controlled very precisely over the rail, particularly quickly and reliably with a simultaneous very low energy consumption.

Provision can also preferably be made so that the slides have ball bearings, rollers, or the like so as to be movable on the guide element of the rail. Thus, the rollers or the balls of the ball bearing move over the guide system on the rail.

A further particularly preferred exemplary embodiment of the present invention can make provision so that the at least two slides are movable independently of one another on the rail. The at least two slides can be moved on the rail in such a way that the laundry item is spread out as efficiently and quickly as possible. In particular in the event that the rail is assigned more than two slides, this plurality of slides must be coordinated in such a way that a number of laundry items can be transferred to the feeding conveyor at the same time or in quick succession. In particular, provision can be made so that two people stand at the rail and transfer laundry items to the splaying clamps in alternation. This can also be performed simultaneously in the case of narrow laundry items.

Provision can preferably also be made so that the at least two slides can be moved to any position on the rail via a control unit. The control unit measures the position of the slides, where the slides can or should travel to, and then drives these with high precision and in minimal time to the corresponding position.

Provision can also be made so that the slides or the splaying clamps can be moved relative to one another by the control unit such that a distance between the slides or the splaying clamps corresponds to the width of a laundry item. Here, provision can be made so that the width of the laundry item is communicated via a sensor unit or a manual or automatic input of the control unit, in particular before the laundry item is transferred to the splaying clamps. The splaying clamps with the slides are then moved away from one another quickly and very precisely in accordance with this width, without the laundry item being damaged or incompletely spread out during this process. The laundry items can thus be spread out efficiently and quickly and also reliably and transferred to the feeding conveyor by means of this linear drive.

BRIEF DESCRIPTION OF THE DRAWINGS

Preferred exemplary embodiments of the invention will be explained in greater detail hereinafter with reference to the drawings, in which:

FIG. 1 shows a schematic perspective illustration of the apparatus for feeding laundry items to a mangle or the like;

DETAILED DESCRIPTION OF PREFERRED EMBODIMENTS

Figure 1:
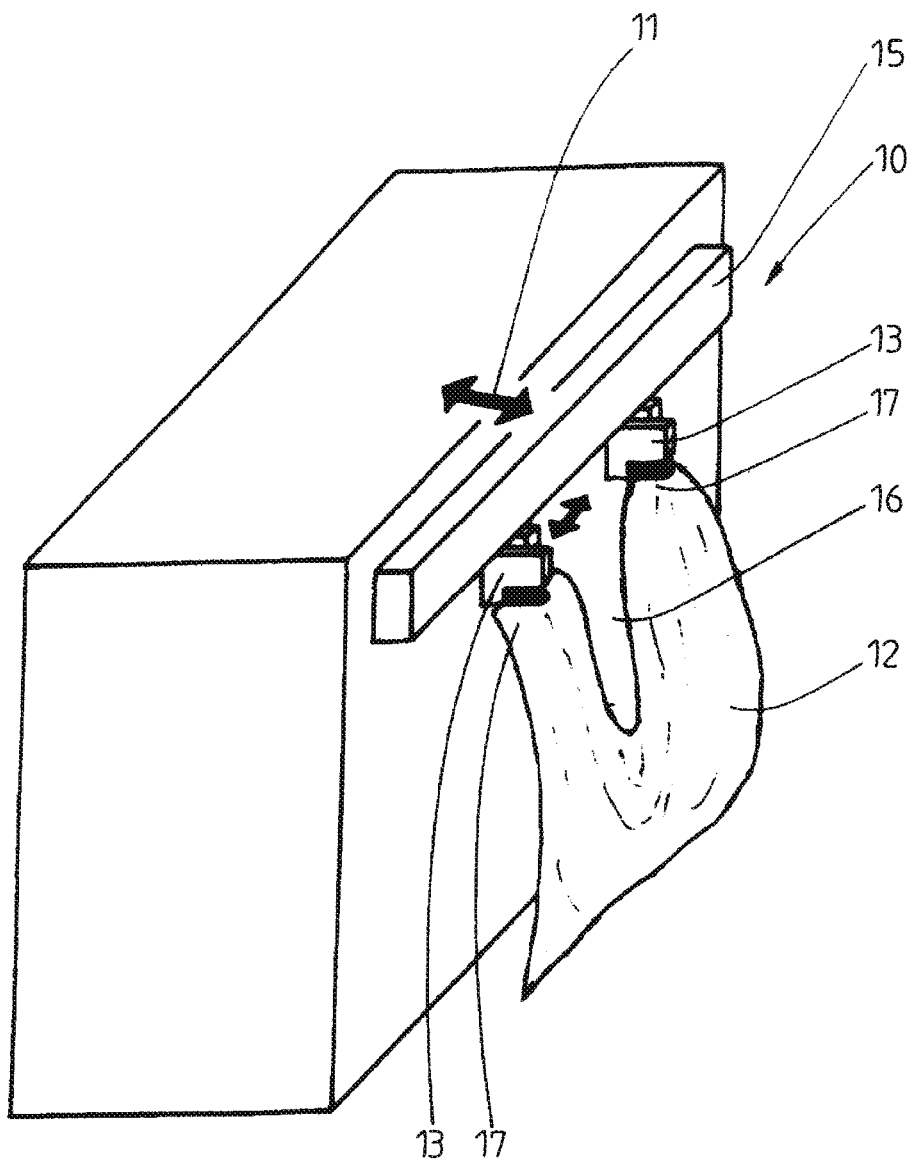

The highly simplified, schematic illustration in FIG. 1 of an apparatus shows the feeding of outstretched laundry items 12 to a mangle (not illustrated in the drawing) or another laundry treatment machine. The apparatus basically has a splaying device 10 and a feeding conveyor (not illustrated) assigned thereto. An individual outspread laundry item 12 can be fed from the feeding conveyor to the mangle or the like. It is also conceivable to provide a stretching conveyor (not shown in the drawings) between the feeding conveyor and the mangle. An outspread laundry item 12 is then transferred from the feeding conveyor 11 to the stretching conveyor and is transferred therefrom to the mangle in a feed direction indicated by an arrow 12. The splaying device 10 and the feeding conveyor are mounted on a common machine frame, which is illustrated in FIG. 1 only by way of indication.

The splaying device 10 is disposed in front of the feeding conveyor in relation to the feed direction 11. The splaying device 10 shown here has a clamp pair formed of two identical clamps 13. The clamps 13 can be moved toward one another and away from one another transversely to the feed direction 11 in front of the feeding conveyor. Each clamp 13 is secured to a slide 14, which for example can be moved with rollers on a rail 15 secured in front of the feeding conveyor in a manner running horizontally transversely to the feed direction 11. As the clamps 13 (FIG. 1) are moved toward one another, opposite corners 17 defining an upper edge 16 of the laundry item 12 are each inserted manually into respective clamps 13. By moving the clamps 13 away from one another, the laundry item 12 is spread or splayed, and in so doing the upper edge 16 of the laundry item 12 is stretched. The laundry item 12 is moved with stretched upper edge 16 from the clamps 13 of the splaying device 10 in the feed direction 11 to the feeding conveyor, more specifically along the horizontal paths extending in the feed direction 11. The laundry item 12 is then transferred from the clamps 13 to the feeding conveyor.

Figure 2:
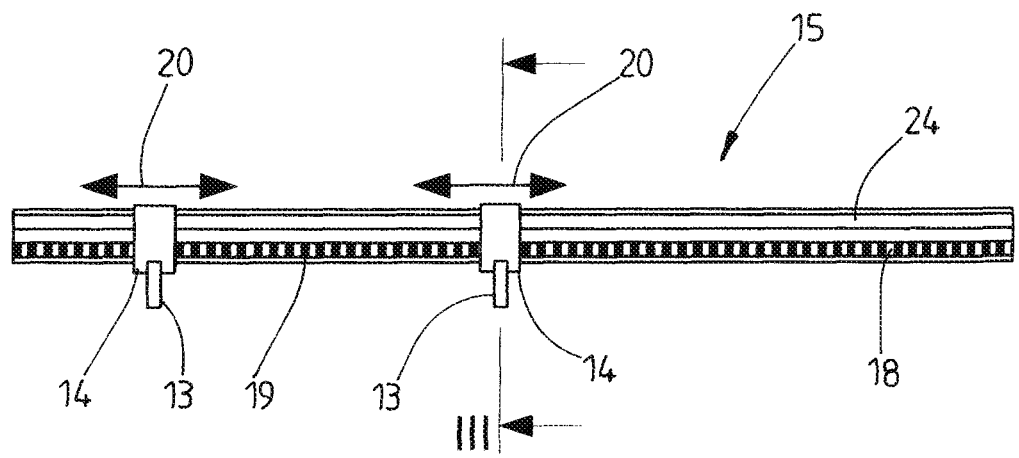
FIG. 2 shows a schematic illustration of a rail with two slides.

The rail 15 illustrated in FIG. 2 is a secondary part of a linear motor. In this exemplary embodiment an alternating sequence of permanent magnets 19 is arranged in a lower part 18 of the rail 15 transversely to the feed direction 11. The permanent magnets 19 have merely a width of a few centimeters or millimeters and are oriented such that the magnetic south pole or north pole protrudes from the drawing plane in alternation.

The two slides 14 illustrated in FIG. 2 form primary parts of the linear drive or of the linear motor. These slides 14 can be moved to and fro independently of one another along the rail 15 in the arrow direction 20. A clamp 13 or splaying clamp for holding a corner 17 of a laundry item 12 is assigned to each of the slides 14. In contrast to FIG. 1, the clamps 13 are oriented downwardly in FIG. 2.

In order to hold a laundry item 12, the slides 14 of the clamps 13 are moved toward one another so that the corners 17 of the laundry item 12 can be inserted into the clamps 13. The slides 14 of the linear drive are then moved away from one another to precisely such an extent that the upper edge 16 of the laundry item 12 is tensioned. The position provided by this distance or the width of the laundry item 12 can be assumed in a precise manner due to the exact control of the linear motor, and therefore a laundry item can be fed efficiently to a mangle in a manner that is gentle on the laundry item.

Figure 3:
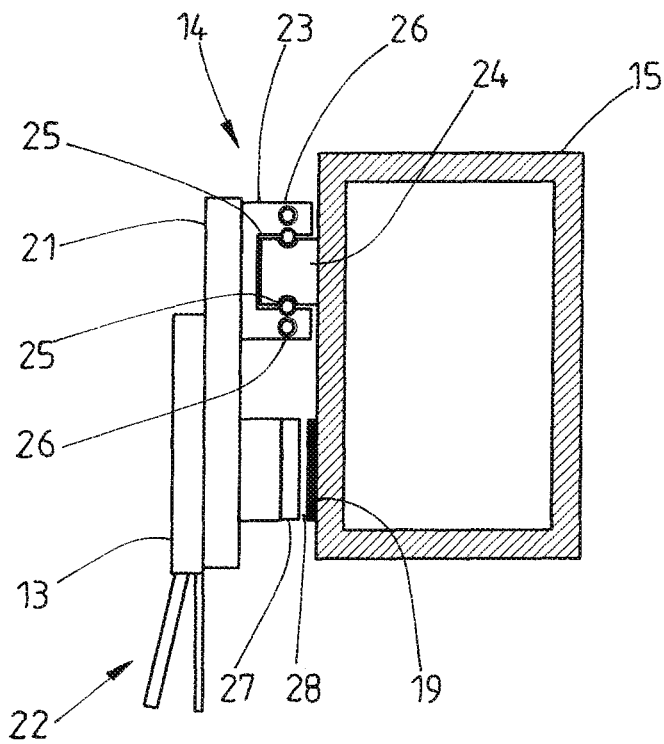
FIG. 3 shows a cross section of the rail illustrated in FIG. 2 and of a slide.

One of a number of possible exemplary embodiments of a slide 14 is illustrated in FIG. 3. The slide 14 basically has a connection 21, at which the clamp 13 can be secured. The clamp 13 here has a slightly opened clamp jaw 22. Since clamps 13 of this type are known, reference is made to the relevant prior art for a detailed description. The slide 14 additionally has a guide system 23, which is fixedly connected to the connection 21. This guide system 23 is displaceably connected on a guide element 24, the guide element 24 being connected with the rail 15. The guide element 24 illustrated in FIG. 3 is a rail-like rib, which is arranged parallel to the sequence of permanent magnets 19 (FIG. 2).

The guide element 24 has two opposite channels 25, which serve as a guide for balls of a ball bearing of the guide element 24. The guide element 24 also has a ball return 26 for movement with as little friction as possible on the guide system 23.

The connection 21 is also assigned at least one electromagnet 27 or a rotor winding. The at least one electromagnet 27 or the two electromagnets 27 are arranged relative to the rail 15 in such a way that they are exactly opposite the permanent magnets 19. The guide system 23 is interlockingly connected to the guide element 24 in such a way that a constant, narrow air gap 28 is formed between the permanent magnets 19 and the electromagnet 27. The play between the guide system 23 and the guide element 24 is so low that the air gap 28 has a practically constant width as the slides 14 move along the rail 15.

By means of electrical control of the electromagnets 27, the slides 14 can now be moved in a highly precise manner and quickly to any arbitrary position on the rail 15. Furthermore, the clamps 13 can automatically open and close via a controller.

Figure 4:
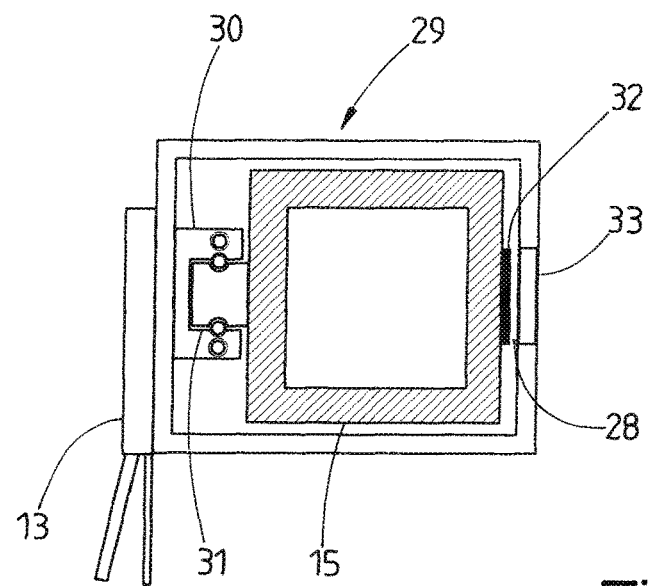
FIG. 4 shows a cross section of a further exemplary embodiment of a rail and of a slide.

In the exemplary embodiment of a slide 29 illustrated in FIG. 4, this comprises the rail 15 in an annular manner. As is precisely the case in the previously described exemplary embodiment of a slide 14 according to the invention, the slide 29 also has a guide system 30 which has a ball bearing and which is movable along a guide element 31. In this exemplary embodiment of a slide 29, the clamp 13 is directly secured to the slide 29.

The alternating sequence of permanent magnets 32 is arranged opposite the guide element 31 on the other side of the rail 15. The electromagnets 33 of the slide 29 are also positioned here again directly opposite the permanent magnets 39 so that a constantly narrow air gap 28 is formed between the permanent magnets 32 and the electromagnet 33 as the slide 29 moves along on the rail 15.

Figure 5:
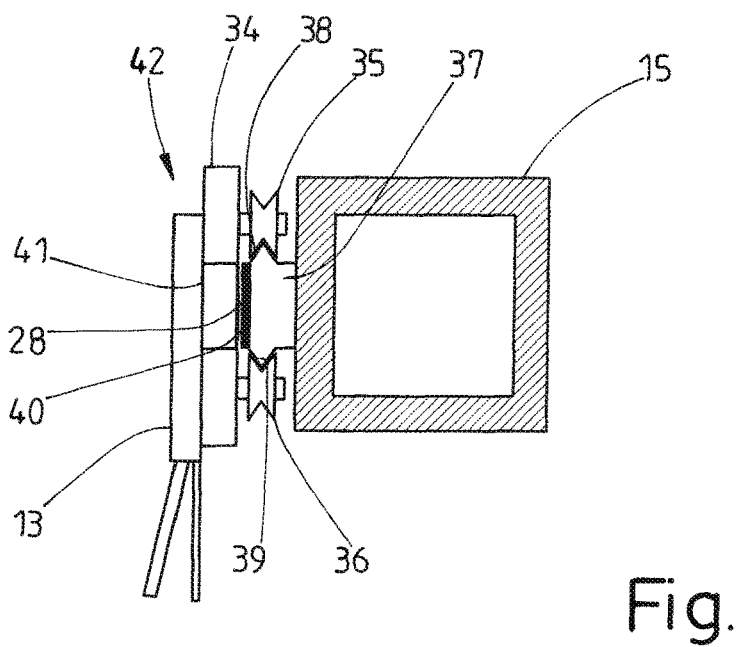
FIG. 5 shows a cross section through a further exemplary embodiment of a slide and of a rail.

In the exemplary embodiment illustrated in FIG. 5, a connection 34 is assigned two rollers 35, 36 as guide system. The axes of rotation of the rollers 35, 36 are positioned transversely to the direction 20 and run on a guide element 37 such that the form of the rollers 35, 36 has corresponding guides 38, 39.

In this exemplary embodiment the permanent magnets 40 are directly assigned to the guide element 37. The connection 34 has, centrally, an electromagnet 41, which is accurately positioned in such a way that it is opposite the permanent magnets 40. As the slide 42 moves along the rail 15, the connection 34 thus moves in such a way over the guide element 34 that a narrow constant air gap 28 forms between the electromagnet 41 and the permanent magnet 40.

It should be expressly noted at this juncture that the present invention is not intended to be limited to the exemplary embodiments presented here.

LIST OF DESIGNATIONS 10 splaying device
11 arrow
12 laundry item
13 clamp
14 slide
15 rail
16 upper edge
17 corner
18 lower part
19 permanent magnet
20 arrow direction
21 connection
22 clamp jaw
23 guide system
24 guide element
25 channel
26 ball return
27 electromagnet
28 air gap
29 slide
30 guide system
31 guide element
32 permanent magnet
33 electromagnet
34 connection
35 roller
36 roller
37 guide element
38 guide
39 guide
40 permanent magnet
41 electromagnet
42 slide

What is claimed is:

1. An apparatus for feeding laundry items (12) to a mangle or the like, comprising:
   a splaying device (10), which is arranged in a feed direction (11) of the laundry item (12) and which has at least two clamps (13) movable transversely to the feed direction (11) along a rail (15) and each assigned a slide (14, 29, 42) for holding opposite corners (17) of the laundry item (12),
   wherein the slides (14, 29, 42) are movable with the clamps (13) by at least one linear drive along the rail (15) in order to stretch out the laundry item (12) attached at the clamps (13),
   wherein the clamps (13) are movable by at least one linear motor,
   wherein the slides (14, 29, 42) are each assigned to a primary part of the linear motor or the slides (14, 29, 42) form the primary parts of the linear motor, wherein the rail (15) is assigned to the secondary part of the linear motor or the rail (15) forms the secondary part, wherein the rail (15) has a guide system (23, 30) for guiding the slides (14, 29, 42), and wherein the guide system (23, 30) is assigned a multiplicity of permanent magnets (19, 32, 40), of which the magnetic poles are arranged in an alternating sequence.

2. The apparatus according to claim 1, wherein the slides (14, 29, 42) each have at least one electromagnet (27, 33, 41) arranged directly opposite the permanent magnets (19, 32, 40).

3. The apparatus according to claim 2, wherein the slides (14, 29, 42) each have at least one rotor winding that is arranged directly opposite the permanent magnets (19, 32, 40).

4. The apparatus according to claim 1, wherein the clamps (13) are secured to the slides (14, 29, 42) via a respective connection (21, 34).

5. The apparatus according to claim 2, wherein the at least one electromagnet (27, 33, 41) is integrated in the connection (21, 34).

6. The apparatus according to claim 5, wherein the at least one electromagnet (27, 33, 41) is secured to the slides (14, 29, 42) on a side of the rail (15) opposite the connection (21, 34).

7. The apparatus according to claim 1, wherein the slides (14, 29, 42) have ball bearings or rollers (35, 36) so as to be movable on the guide system (23, 30) of the rail (15).

8. The apparatus according to claim 1, wherein the slides (14, 29, 42) are movable independently of one another on the rail (15).

9. The apparatus according to claim 1, wherein the slides (14, 29, 42) are movable to any position on the rail (15) via a control unit.

10. The apparatus according to claim 9, wherein the slides (14, 29, 42) are movable relative to one another by the control unit in such a way that a distance between the slides (14, 29, 42) corresponds to the width of a laundry item (12).

11. The apparatus according to claim 9, wherein the clamps (13) are movable relative to one another by the control unit in such a way that a distance between the clamps (13) corresponds to the width of a laundry item (12).

12. The apparatus according to claim 1, wherein the feeding conveyor is assigned a depositing strip.

* * * * *